United States Patent Office 3,468,932
Patented Sept. 23, 1969

3,468,932
DERIVATIVES OF POLYAMINECARBOXYLIC ACIDS
Verner L. Stromberg, St. Louis, Mo., assignor to Petrolite Corporation, Wilmington, Del., a corporation of Delaware
No Drawing. Filed Feb. 11, 1965, Ser. No. 432,014
Int. Cl. C07c *99/00, 101/26*
U.S. Cl. 260—482    4 Claims

ABSTRACT OF THE DISCLOSURE

A quaternary reaction product of (1)

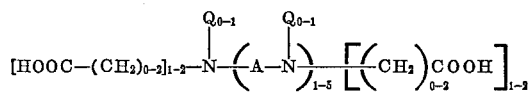

where Q is H or [$(CH_2)_{0-2}$—COOH] and A is an alkylene group having 2–10 carbon atoms, for example, diethylene triamine pentacetic acid,
(2) An epihalohydrin such as epichlorohydrin, and (3) a tertiary amine of the formula R'$_2$NR where R' is methyl or ethyl and R is a hydrocarbon group having at least about 6 carbon atoms. The reaction product is formed by mixing and heating (1) and (2) in water at approximately 50–80° C. for approximately ½ to 1 hour, then adding (3) to the aqueous solution and then heating and stirring at about 80–90° C. for about ½ to 1 hour. The reaction product is used for inhibiting corrosion in a system by treating the system with it and also by treating the system with it and a film-forming corrosion inhibitor. Also, the reaction product is used in a process of water flooding by using said reaction product together with a film-forming corrosion inhibitor.

---

This invention relates to quaternary derivatives of amine-N-polycarboxylates, and to the uses therefor.

The compounds of this invention may be illustrated by the following formula:

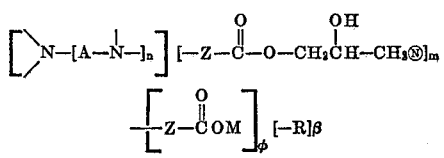

where $n$ is a number, for example 0–10 or more, but preferably 1–5; A is the moiety of a polyamine such as alkylene (branched or straight-chain) having for example 2–10 or more carbons, but preferably 2–3 carbons; Z is the moiety of a carboxylic acid, such as an alyklene group (straight or branch-chain) having for example 1–10 or more carbons, but preferably 1–3 carbons; $m$ is a number whose maximum is determined by the number of available valances on the nitrogens of the amine, such as 2–10 or more but having a minimum of at least 2 per molecule; Ⓝ represents a quaternary amino group; and $\phi$ represents the number of groups on the molecule whose maximum is determined by the nitrogen valences minus $m$ and whose minimum may be zero; R represents hydrogen or a substituted group, such as a hydrocarbon group, for example an alkyl group bonded to the nitrogens of the amine; and $\beta$ is a number determined by the available nitrogen valences on the amine minus $m+\phi$ after the substitution of the $m+\phi$ groups on the amine.

They may be derivatives of either mono or polyamines, but preferably polyamines.

The following formulae illustrate polyamine derivatives.

TABLE I

The following formulae illustrate polyamine derivatives:

(1)

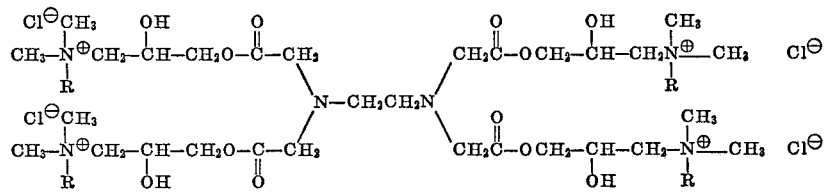

(2)

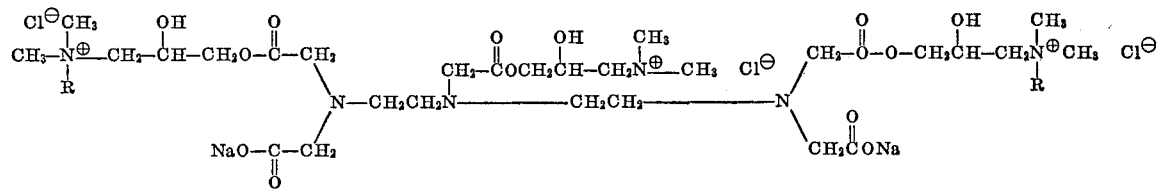

(3)

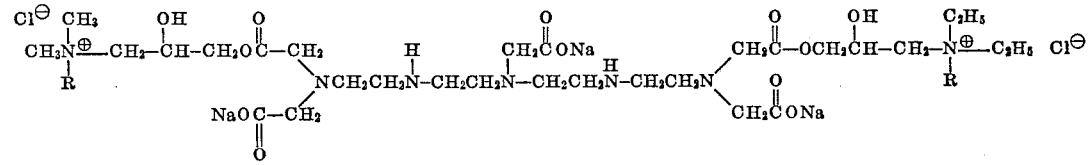

(4)

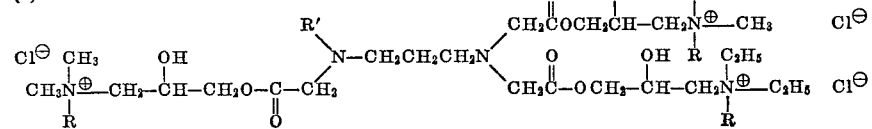

(5) 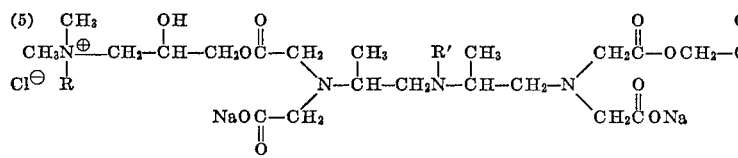

(6) 

(7) 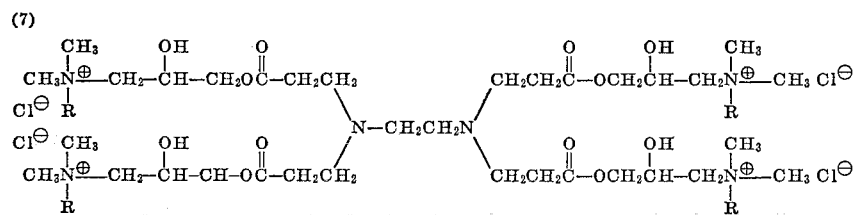

(8) 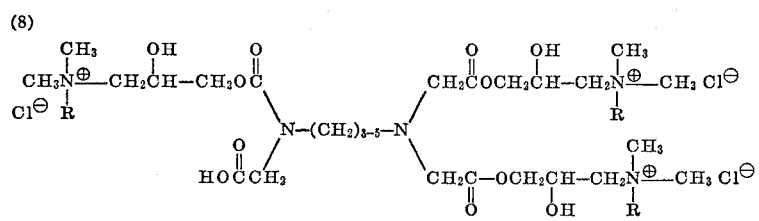

The following illustrate monoamine derivatives:

(9) 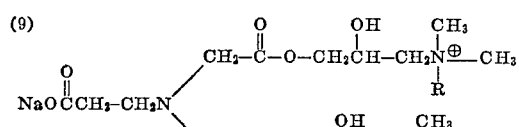

(10) 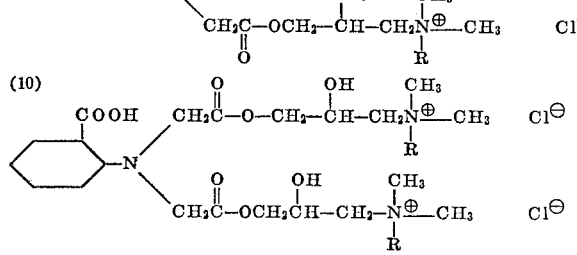

(11) 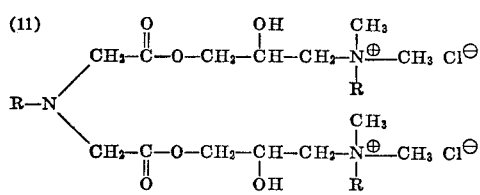

(12) 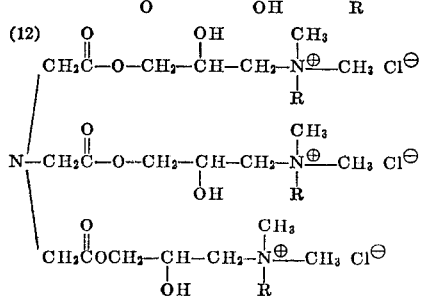

(13) 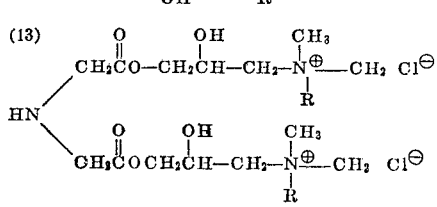

(14) 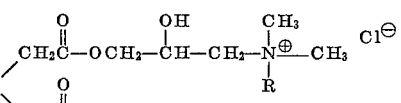

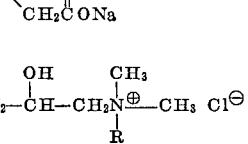

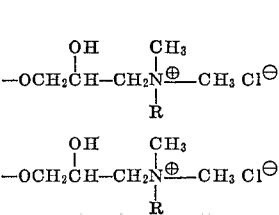

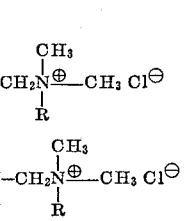

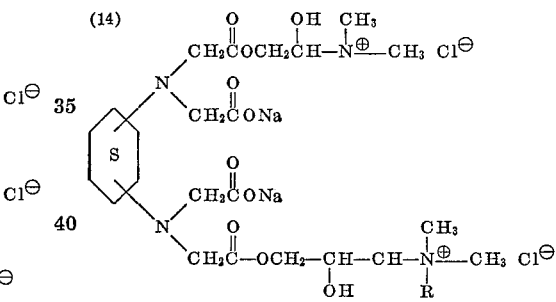

(Derivatives of diamino-cyclohexane)

In the above formulae, the N-bonded R and R′ (which may be the same or different) are substituted groups, for example hydrocarbon groups such as alkyl, alkenyl, alkinyl, aryl, alkaryl, aralkyl, etc. They preferably have at least about six carbons, such as 8–20 and most preferably 12–18 carbons. Although the epihalohydrin reaction products are assigned specific reaction positions, isomers thereof are also included. For example in Example 2, the position of reaction may be N,N,N′, instead of N, N′,N″.

The above formulae illustrate the following structural features of these compounds.

(1) They are monoamines or polyamines; (2) which contain at least two N-bonded carboxylic groups (3) of which at least two N-bonded carboxylic groups have been reacted with an epihalohydrin (4) which product (3) is further reacted with an amine to form a quaternary group; (5) the remainder of the groups bonded to the nitrogen, which are not N-bonded carboxylic groups or derivatives thereof as defined above, are hydrogen or substituted groups such as alkyl groups; (6) the N-carboxylate groups which do not contain quaternary groups are free acids or salts thereof. For example, these compositions are formed by:

(1) Converting the monoamine or polyamine to the desired amine carboxylic acids;

(2) Reacting said carboxylic acids with the desired number of moles of an epihalohydrin so as to form the

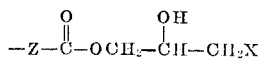

and derivatives thereof, and (3) Reacting the epihalohydrin derivative with a tertiary amine to form the quaternary group

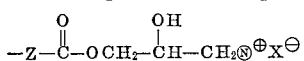

The following are examples of polyamines which can form the basic unit of the product of this invention.

Ethylene diamine
Diethylene triamine
Dibutylene triamine
Triethylene tetramine
Tripropylene tetramine
Tetraethylene pentamine
Tetrapropylene pentamine
Tetrabutylene pentamine Mixed ethylene, propylene and/or butylene, etc. polyamines and other members of the series, for example

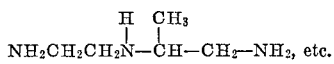

The above polyamines modified with aliphatic groups can be employed, for example with alkyl, alkenyl, etc. groups such as derived from coconut oil, tallow, tall oil, soya, etc. for example the Duomeens sold by Armour, such as Duomeen T, Duomeens S, etc. for example of the formula

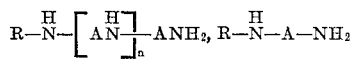

where $n$ is a number for example 1–5 and A is alkylene such as ethylene, propylene, butylene, etc., branched or straight chains.

Monoamines comprise ammonia and derivatives thereof for example of the formula:
$RNH_2$ where R is a substituted group for example alkyl, alkenyl, aryl, etc.

The carboxylate moiety of the molecule may be any suitable group, for example of the formula

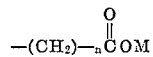

such as where $n$ is 1–10, for example 1–4, but preferably 1–2. The $-(CH_2)-_n$ group (or Z) can be straight chained or branched, for example

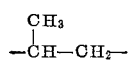

and M may be hydrogen or a suitable cation such as sodium, potassium, amino, etc.

The epihalohydrin employed is for example of the formula

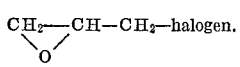

The quatenary group Ⓝ represents any suitable quaternary group whether it be a mono or a polyquaternary. In the case of a polyamine at least one amino group thereon should be quaternized. Example of amines, mono, poly-, heterocyclic, etc. which can be employed in this invention can be found in U.S. Patent 2,996,365 which is by reference incorporated into the present disclosure as if part of the present specification.

Although a wide variety of amines may be employed in forming the quaternary group, I prefer to employ a monoamine of the formula

wherein R, which may or may not be the same, are lower alkyl such as methyl, ethyl, etc. and R' is a higher alkyl having at least about 6 carbon atoms, such as about 8–30 or more carbon atoms, but preferably about 12–18 carbon atoms. In the preferred embodiment both of the R's are methyl.

The halogen forming the anion is generally the chloride ion since it is derived from epichlorohydrin but may be any other suitable anion such as bromine, etc.

In practice, the compositions of this invention are facilely prepared. Since many of the amino carboxylic acids are commercially available (Versene type compounds) they are generally employed as the starting material. Alternatively, they can be prepared by reacting the polyamine with a halocarboxylate

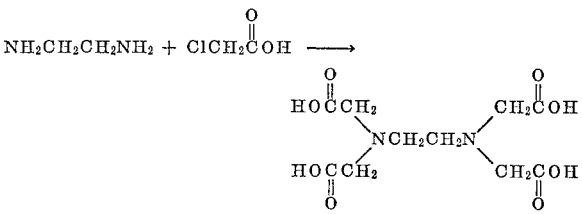

or reacted as follows:

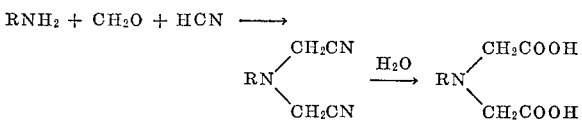

These reactions are well known to the art.

The amino carboxylic acid are then reacted with an epihalohydrin in accord with the following reaction:

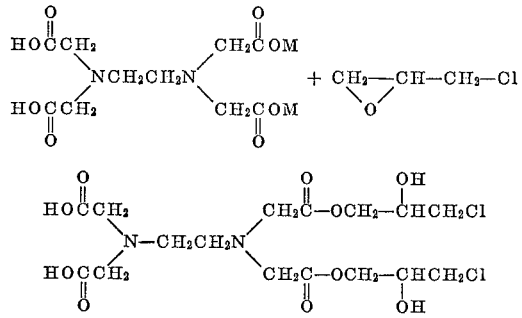

The reaction is generally carried out in water by mixing and heating the reactants until the cloudy mixture becomes clear in water. In practice this is carried out at about 50–80° C. for about ½ to 1 hour.

Thereupon an amine is added to this product in accord with the equation:

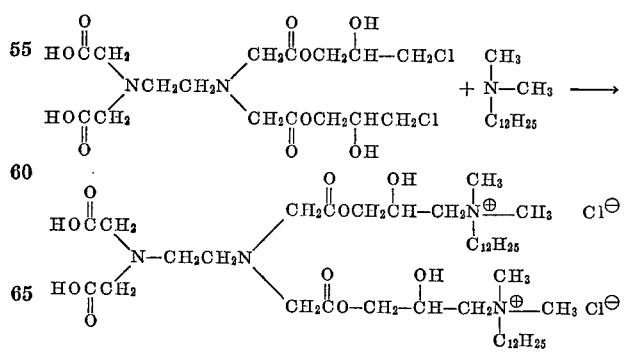

In practice, this is affected by adding the amine to the clear aqueous solution of the product of the previous step and heating and stirring at 80–90° C. for an additional ½ to 1 hour until the cloudy solution which forms on the addition of the amine becomes clear. The aqueous solution of the final product is generally employed in specific applications.

The following examples are presented by way of illustration:

EXAMPLE 1

Versenex 80 (0.05 mole), the diethylene triamine pentacetic acid, sodium salt, is added to 259 g. of water. Thereupon 0.2 mole epichlorohydrin is added. The resultant cloudy mixture is heated with stirring at 60° C. for about 30 minutes after which time a clear solution results. Thereupon Armeen DM–12D (0.2 mole) (dimethyl cocoamine) is added. Heating and stirring of this cloudy mixture is continued for an additional 40 minutes at 90° C. when the solution becomes clear. The product is that of Table I, Ex. 2. However, it should be noted that the positions of reaction have been arbitrarily assigned and may have reacted with other carboxylated groups.

Since all products of this invention are prepared in essentially the same manner, specific details for each example would be redundant. Thus, the compositions of Table I are similarly prepared in aqueous solution.

These compounds may be used in inhibiting the corrosion of metals, and particularly in preventing corrosion of metals, and particularly in preventing corrosion of metals and particularly iron, steel, and ferrous alloys. The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boil weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. The results, for example, when the tubing is surrounding at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the hereindescribed reagents appears to be maintained for an appreciable time after treatment ceases, but eventually is lost unless another application is made.

For the protection of gas wells and gas-condensate wells, the amount of corrosion inhibitor required will be within range of one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

More particularly, they can be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

I have now discovered a method of preventing corrosion in systems containing a corrosive aqueous media, and most particularly in systems containing brines, which is characterized by employing the compounds described herein.

I have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

The invention, then is particularly concerned with preventing corrosion in a water flooding process characterized by the flooding medium, containing an aqueous or an oil field brine solution of these compounds.

In many oil fields large volumes of water are produced and must be disposed of where water flooding operations are not in use or where water flooding operations cannot handle the amount of produced water. Most states have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of these compounds, sufficient to prevent corrosion.

While the flooding medium employed in accordance with the present invention contains water or oil field brine and the compounds of this water, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other secondary recovery methods.

Besides being employed as corrosion inhibitors, themselves, the compositions of this invention have a synergistic effect on other corrosion inhibitors, particularly those of the film-forming type. For example, in certain corrosive systems where acylated polyamines such as cyclic amidines, amides, etc. are employed as corrosion inhibitors, the combination of acylated polyamines with the compositions of this invention are more effective than either alone. They are particularly effective for making water insoluble or slightly soluble corrosion inhibitors effective in aqueous systems such as in water flood operations.

The ratio of the present composition to the film-forming inhibitor can vary widely, for example, from 1–99% of the total inhibitor combination, such as from 5–50%, for example from 10–30% but preferably from 5 to 25%. However, the percentage employed for optimum performance will depend on the particular corrosion inhibitors employed, the particular corrosive system in which it is employed, and the like.

The concentration of the corrosion inhibitors of this invention, alone or in combination, will vary widely depending on the particular composition, the particular system, etc. Concentrations of at least 5 p.p.m., such as about 10 to 10,000 p.p.m. for example about 50 to 5,000 p.p.m., advantageously about 75 to 1,000 p.p.m., but preferably about 100–500 p.p.m. may be employed. Larger amounts can also be employed such as 1.5–5.0% although there is generally no commercial advantage in so doing. For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the costs thereof.

By varying the constituents of the composition, the compounds of this invention can be made more oil or more water soluble, depending on whether the composition is to be employed in oil or water systems.

Film-forming inhibitors

In general, the film-forming organic corrosion inhibitors with which these compositions are effective are generally heteropolar, for example, cationic or anionic in nature. The most widely used type of film-forming corrosion inhibitors is the cationic type, which is generally a comparatively high molar organic compound containing one or more basic nitrogen atoms.

Anionic film-forming inhibitors contain hydrophobic groups, which have generally large hydrocarbon radicals, and acid groups. In general, they are used as the free acid or as salts thereof, for example as alkali or alkaline earth metal, ammonium or amine, etc. salts, for example as the sodium, potassium, calcium, ammonia, amine, etc. salts.

In general, assuming a monomolecular layer, the more effective film-forming corrosion inhibitors are those which cover the largest area per molecule and form the most coherent and oriented film.

Typical, but non-limiting examples, of film-forming corrosion inhibitors are presented below.

Nitrogen bases

A wide variety of these compounds are known to be film-forming corrosion inhibitors. The following are a few non-limiting examples:

(1) Oxazolines (U.S. Patent 2,587,955)
(2) Tetrahydropyrimides (U.S. Patent 2,640,029)
(3) Imidazolenes (Re. 23,227)
(4) Pyrrolinedinone (U.S. Patent 2,466,530)
(5) Amino amides (U.S. Patents 2,550,682 and 2,598,213)
(6) Quaternary amines (U.S. Patent 2,659,693)
(7) Monoamines, such as Rosin Amine (Oil Gas Journal 46, No. 31, 91–6 (1946)), Oxyalkylated Rosin Amine (U.S. Patent 2,564,749), Rosin Amine+solubilizing agent (U.S. Patents 2,564,757 and 2,564,753)

Carboxylic acids

A wide variety of these compounds are known to be film-forming corrosion inhibitors. The following are non-limiting examples:

(1) Naphthenic acids (U.S. Patents 2,430,951 and 2,434,978)
(2) Dimerized unsaturated fatty acids (U.S. Patent 2,632,695)

(3) Fatty acids, such as ricinoleic acid (U.S. Patents 2,481,372 and 2,507,401)
(4) Alkenyl succinic acids (British Patent 576,089)
(5) Alkenyl succinic acid amine reaction products (U.S. Patents 2,604,451, 2,568,876, 2,540,800, 2,638,449, 2,638,450 and 2,682,489)
(6) Phthalamic acids (U.S. Patent 2,408,102)
(7) Monoesters and amides of dicarboxylic acids (U.S. Patent 2,408,102)
(8) Acid-esters, for example, sorbitan monooleate and fatty acid partial esters of pentaerythritol (U.S. Patents 2,479,424 and 2,574,954)
(9) Sorbitan and pentaerythritol (U.S. Patent 2,580,036) Acid-ester and amine salts of fatty acids (U.S. Patents 2,564,422 and 2,564,423)
(10) Acids from oxidized paraffin wax.
(11) Dimerized and polymerized unsaturated fatty acids (U.S. Patents 2,632,709, 2,627,474, 2,631,979)
(12) Amides of amino acids such as the sarcosines for example $$R\overset{O}{\underset{\|}{C}}-\underset{R'}{\overset{|}{N}}-CH_2COOH$$

R = fatty hydrocarbon group
R' = H, lower alkyl

Sulfonic acids

A wide variety of these compounds are known to be film-forming corrosion inhibitors. The following are a few non-limiting examples:

(1) Mahogany sulfonates and salts thereof (U.S. Patents, 2,533,301, 2,533,302, 2,533,303, 2,533,304, 2,495,266, 2,511,250, 2,598,725, 2,499,710, 2,509,786, 2,582,733)
(2) Synthetic alkyl aryl-sulfonates (U.S. Patents 2,562,845 and 2,546,552).

Miscellaneous corrosion inhibitors

A wide variety of other compounds are known to be film-forming corrosion inhibitors. The following are a few non-limiting examples:

(1) Acid-esters of phosphoric and thiophosphoric acids.
(2) Substituted ureas and thioureas.
(3) Propargyl compounds, for example propargyl alcohol, sulfide, etc.

The imidazolines employed in the specific examples are a member of the cyclic amidine family of compounds and are prepared in the manner described in Reissue 23,227, U.S. Patent 2,468,163, and elsewhere.

They may be described, for example, as follows:

(1)

$$R-C\underset{\underset{DR}{|}}{\overset{N}{\underset{N}{\diagup\!\!\!\diagdown}}}(CB_2)_{2-3}$$

(2)

$$(CB_2)_{2-3}\underset{\underset{DR}{|}}{\overset{N}{\diagup\!\!\!\diagdown}}C-R-C\underset{\underset{DR}{|}}{\overset{N}{\diagup\!\!\!\diagdown}}(CB_2)_{2-3}$$

where $$R-\overset{O}{\underset{\|}{C}}-\quad\text{and}\quad-\overset{O}{\underset{\|}{C}}-R-\overset{O}{\underset{\|}{C}}-$$

are residues derived from the carboxylic acid employed in preparing the compound wherein R is, for example, a hydrocarbon radical, having, for example, up to about 30 carbon atoms, such as 1–30 carbon atoms, B is hydrogen or a hydrocarbon radical, for example, a lower alkyl, such as methyl—for example, where $CB_2$ is $$-\underset{\underset{CH_3}{|}}{CH}-CH_2-,\quad -\underset{\underset{CH_3}{|}}{CH}-\underset{\underset{CH_3}{|}}{CH}-,\quad -CH_2-\underset{\underset{CH_3}{|}}{CH}-CH_2-$$

but preferably $-CH_2-CH_2-$ or $-CH_2-CH_2-CH_2-$, and R is the residue derived from the cyclic amidine-forming polyamine, for example where DR is $-C_nH_{2n}-NR'-R'$, $-C_nH_{2n}-NH-\overset{O}{\underset{\|}{C}}-R'$, $-C_nH_{2n}-O-\overset{O}{\underset{\|}{C}}-R'$ $-C_nH_{2n}-O-R'$, $-C_nH_{2n}-NR'-C_nH_{2n}-NR-R'$ $-C_nH_{2n}-NR'-C_nH_{2n}-NR'-C_nH_{2n}-NR'-R'$ $$-C_nH_{2n}-\underset{\underset{CH_2-CH_2}{\diagdown\quad\diagup}}{N}\overset{\overset{R}{|}}{\underset{C}{\diagup\!\!\!\diagdown}}N,\text{ etc.}$$

and wherein $n$ is, for example, the numeral 1 to 6 and R' is hydrogen or an aliphatic, cycloaliphatic hydrocarbon, etc., radical.

In the simplest case, the group R' may be directly attached to the 1-nitrogen atom of the ring, as follows:

$$R-C\underset{\underset{R'}{|}}{\overset{\diagup N-CH_2}{\diagdown N-CH_2}}$$

The particularly outstanding corrosion-preventive reagents result when the cyclic amidine contains basic nitrogen groups in addition to those inherently present in the imidazoline ring. In general, compounds of this type which are effective are those in which the basic nitrogen group is contained in the radical D in the above formula.

In this case the products may be represented by the formula $$R-C\underset{\underset{Y-R'}{|}}{\overset{\diagup N-CH_2}{\diagdown N-CH_2}}$$

where R and R' are hydrogen or a hydrocarbon radical, and in which at least one of the groups R and R' is an aliphatic or cycloaliphatic hydrocarbon group containing from 8 to 32 carbon atoms; and Y is a divalent organic radical containing amino groups. The group R' may be, and usually is, an amino nitrogen substituent. Examples of organic radicals which Y—R' may represent are $-C_2H_4-NR_2'$, $-C_2H_4-NR'-C_2H_4-NR_2'$, $-C_3H_6-NR_2'$ $-CH_2-\underset{\underset{NR_2'}{|}}{CH}-CH_3$, $-CH_2-\underset{\underset{NR_2'}{|}}{CH}-CH_2OH$, $-C_2H_4-\underset{\underset{\underset{R}{|}}{C}}{N}\overset{\overset{CH_2-CH_2}{\diagup\quad\diagdown}}{\diagdown\quad\diagup}N$ $-C_2H_4-NR'-C_2H_4-NR'-C_2H_4-NR_2'$ where R' and R have their previous significance.

Of this class of reagents in which an amino group occurs as a portion of the 1-nitrogen substituent, those which are derived, at least theoretically, from the polyethylene polyamines appear to be particularly effective as corrosion inhibitors and are so outstanding as to constitute an invention within an invention. These have the general formula $$R-C\underset{\underset{(C_2H_4NR')_mR'}{|}}{\overset{\diagup N-CH_2}{\diagdown N-CH_2}}$$

where R and R' have their previous meanings, and $m$ is a small number, usually less than 6. Amides of these imidazolines are also effective.

Imidazolines have been described in Re. 23,227. A typical claim is as follows:

"A process for preventing corrosion of metals, comprising the step of applying to such metals a substituted imidazoline selected from the class consisting of

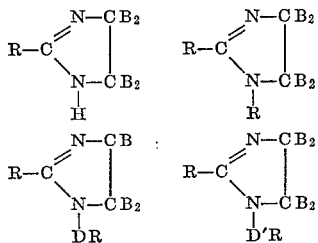

in which D represents a divalent, non-amino organic radical containing less than 25 carbon atoms, composed of elements from the group consisting of C, H, O, and N; D' represents a divalent, organic radical containing less than 25 carbon atoms, composed of elements from the group consisting of C, H, O, and N; D' represents a divalent organic radical containing less than 25 carbon atoms, composed of elements from the group consisting of C, H, O, and N, and containing at least one amino group; R is a member of the class consisting of hydrogen and aliphatic and cycloaliphatic hydrocarbon radicals; with the proviso that at least one occurrence of R contains 8 to 32 carbon atoms; and B is a member of the class consisting of hydrogen and alkyl radicals having not over 2 carbon atoms, with the proviso that at least three occurrences of B be hydrogen."

Tetrahydropyrimidines have been described in U.S. Patent 2,640,028 where a typical claim is as follows:

"A process for preventing corrosion of metals including the step of applying to such metals a substituted tetrahydropyrimidine of the formula type:

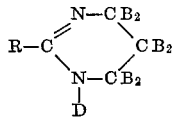

where D is a member of the class consisting of D'—R and R'D' represents a divalent organic radical containing less than 25 carbon atoms, composed of elements from the group consisting of C, H, O, and N; R is a member of the class consisting of hydrogen and hydrocarbon radicals, with the proviso that at least one occurrence of R contains from 8 to 32 carbon atoms; B is a member of the class consisting of hydrogen and hydrocarbon radicals containing less than 7 carbon atoms, with the proviso that at least three occurrences of B be hydrogen."

In general, the preferred embodiments of film-forming corrosion inhibitors are of the type of cyclic amidines described above and acylated alkylene polyamines of the type described in U.S. Patent 2,598,213 which are by reference incorporated in the present application.

As is quite evident, other film-forming corrosion inhibitors are known and new film-forming inhibitors will be constantly developed which are useful in this invention. It is therefore not only impossible to attempt a comprehensive catalogue of such inhibitors, but to attempt to describe the invention in its broadest aspects in terms of specific chemical names of film-forming corrosion inhibitors used would be too voluminous and unnecessary, since one skilled in the art could by following known testing procedures select the proper film-forming inhibitor. This invention lies in the use of suitable film-forming corrosion inhibitors in the process and compositions of this invention and their individual composition is important only in the sense that their properties can effect the process. To precisely define each specific film-forming corrosion inhibitor useful in this invention in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence those film-forming corrosion inhibitors suitable for this invention by means of the tests normally used to select film-forming corrosion inhibitors. In analogy to the case of a machine wherein the use of certain materials of construction or dimensions of parts would lead to no practical useful result, various materials will be rejected as inapplicable where others would be operative. I obviously assume that no one will wish to use a useless film-forming, corrosion inhibitor or will be misled because it is possible to misapply the teachings of the present disclosure in order to do so. Thus, any film-forming corrosion inhibitor than can perform the function stated herein can be employed. In practice, one would select a compound which prior experience has shown to be efficient film-forming corrosion inhibitor.

Many well known tests can be employed in selecting film-forming corrosion inhibitors, for example, the tests described in U.S. Patent 2,987,521, and 2,987,522, i.e., Stirring Tests, Tanker Tests, and Static Weight Loss Tests, and the Copper Ion Displacement Test. This latter test is described in application Ser. No. 695,233, filed Nov. 8, 1957. In general, those inhibitors which give the greatest protection at the lowest concentration in these tests are preferred.

The following examples are presented by way of illustration and not of limitation.

Static weight loss tests

These tests have been run on both synthetic and naturally occurring fluids. The test procedure involved the measurement of the corrosive action of the fluids inhibited by the compositions herein described upon sandblasted SAE 1020 steel coupons and the comparison thereof with results obtained by subjecting identical test coupons to the corrosive action of identical fluids containing no inhibitor.

Clean pint bottles were charged with 400 ml. of 10% sodium chloride solution saturated with hydrogen sulfide and a predetermined amount of inhibitor was then added. Weighed coupons were then added, the bottles tightly sealed and allowed to remain at room temperature for three days. The coupons were then removed, cleaned, dried and weighed.

The change in the weight of the coupons during the corrosion test were taken as a measurement of the effectiveness of the inhibitor compositions. Protection percentage was calculated for each test coupon taken from the inhibited fluids in accordance with the following formula $$\frac{L_1-L_2}{L_1}\times 100 = \text{Percent protection}$$

in which $L_1$ is the loss in weight of the coupons taken from uninhibited fluids and $L_2$ is the loss in weight of coupons which were subjected to the inhibited fluids.

TABLE II

| Inhibitor (100 p.p.m. based on total fluids) | Mg. Loss | Percent Protection |
|---|---|---|
| Blank | 150 | |
| Compound: | | |
| 1. Ex. 2, Table I | 27 | 82 |
| 2. Acylated Polyamine* | 19 | 87 |
| Combination— | | |
| 3. Ex. 2 and 1 of this Table II (10%, Ex. 1) | 6 | 96 |
| 4. Ex. 3, Table I | 41 | 73 |
| 5. Ex. 7, Table I | 49 | 67 |
| 6. Ex. 2 and 4, Table II, (10% Ex. 4) | 11 | 93 |
| 7. Ex. 9, Table I | 43 | 71 |
| 8. Ex. 11, Table I | 51 | 66 |
| 9. Acylated Polyamine* | 25 | 83 |
| 10. Ex. 9 and 8, Table II (10% Ex. 8) | 16 | 89 |

*See the following formula:

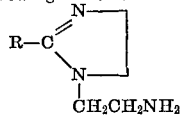

R=Lauryl (Ex. 2)
R=Coco (Ex. 9)

These are formed by reacting the fatty acid with diethylenetramine under cyclic amidines-forming conditions (see Re. 23,227), the crude reaction product is employed.

Where both the film-forming amine and the compounds of this invention are employed, the compounds of this invention comprise 10% by weight of the total corrosion inhibitor formulation.

Other species of this invention can also be employed either alone or in combination with other film-forming corrosion inhibitors.

The compositions of this invention were field tested in a water flood operation. The following is presented as a representative example of such tests.

A secondary recovery unit in the Illinois area was utilized to evaluate the following inhibitor composition.

The protection afforded by this chemical was evaluated by using small, mild steel plates which had been sand-blasted and weighed. These were exposed to the corrosive medium by insertion into injection lines near the well head for periods of two weeks. The specimens were retained on a plug by means of a plastic which afforded insulation for the plates so as to prevent interference by galvanic currents. After exposure the coupons were cleaned and dried and weighed.

The results were expressed in mils penetration per year which expresses the depth of surface in thousandths of an inch, removed in a year assuming the corrosion had occurred uniformly over the entire surface. This value was readily calculated by the simple formula:

$$\text{MPY} = \frac{\text{Weight of metal removed}}{\text{Density of metal} \times \text{area} \times \text{years}} \times 1000$$

In units similar to that used for this evaluation penetration rates of 4 MPY or less are generally acceptable. Obviously the lower values are more acceptable.

TABLE III

| Inhibitor, p.p.m. | M/6–M/20 | M/20–M/4 | M/4–M/18 | Avg. |
|---|---|---|---|---|
| None | 14.7 | 10.3 | 12.4 | 12.8 |
|  | M/18–M/1 | M/1–M/15 | M/15–M/29 |  |
| Ex. 3, Table II, 10 p.p.m. | 2.3 | 1.1 | 1.5 | 1.3 |
| Ex. 3, Table II, 20 p.p.m. | 0.9 | 0.3 | 1.2 | 0.8 |

M indicates a month without specific designation. Experience has shown good correlation between penetration rates as shown by coupons and the well corrosion history in this area.

Other derivatives

These products may be further reacted to form derivatives thereof, for example, they may be oxyalkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylamino-epoxy, propane of the structure

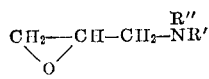

where the R's are alkyl.

They may be acylated with mono such as aromatic acids, fatty acids, aliphatic acids, etc. and polycarboxylic acids aliphatic dicarboxylic acids, aromatic dicarboxylic acids for example diglycolic, maleic, phthalic, succinic, etc. acids to form esters both full and fractional.

These compounds may also be treated with more than one agent, for example, they may be acylated, then oxyalkylated, oxyalkylated then acylated, oxyalkylated then acylated then oxyalkylated, etc.

Other uses

In addition to the anti-corrosive uses described above, these compositions and derivatives thereof can be used as follows:

(1) as demulsifiers for oil-in-water emulsions, for both O/W and W/O
(2) as biocides i.e. bacteriocides, algicides, etc.
(3) as additives to various petroleum fuels including gasoline, diesel fuel, jet fuels, etc.
(4) as gasoline anti-icers and anti-stallers
(5) as flotation agents, such as flotation collection agents
(6) as asphalt emulsifiers and anti-stripping agents for asphalt-mineral aggregate compositions
(7) as emulsifiers, for example, in metal cleaners, auto polishes, wax emulsions, etc.
(8) as additives for sludging oil and cutting oils
(9) as fuel "dehazing" agents
(10) as agents for preparing emulsions for the "hydrofrac" process of enhancing oil recovery
(11) as agents to prepare polymer emulsions
(12) as agents of solvents to inhibit paraffin deposition
(13) as agents for the textile industry such as mercerizing assistants, wetting agents, rewetting agents, penetrating agents, dispersing agents, softening agents, dyeing assistants, etc.
(14) as anti-static agents for textiles, plastics, etc.
(15) as agents in leather processing
(16) as lube oil additives
(17) as emulsifiers for insecticidal and agricultural compositions
(18) as additives for rubber latices, for example, to prevent acid coagulation
(19) as additives in the production of latex foam rubber, for example, as gel sensitizers and processing aids in the manufacture of foam rubber
(20) as additives for pigment dispersion in various applications such as paints, plastic, rubber, etc.
(21) as additives for primer paints to help insure adhesion to metallic surfaces
(22) as additives useful as a freeze-thaw stabilizer for latex-base paints
(23) as flocculating agents
(24) as anti-caking agents to prevent caking due to collection of moisture or hygroscopic material, for example, in fertilizers, Sylvite, sodium nitrite, rock salt, amonium sulfate and chloride, etc.
(25) as agents for the pulp and paper industry, such as sizing aids, etc.
(26) as agents for "self-sanitizing" fabrics, absorbent papers, etc.

Having thus described my invention what I claim as new and desire to obtain by Letters Patent, is:

1. The quaternary reaction product of (1)

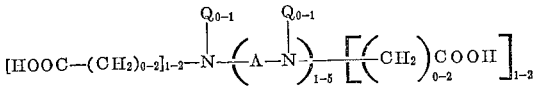

where:
Q is a radical selected from the group consisting of hydrogen and $[(CH_2)_{0-2}COOH]$ and
A is an alkylene group having 2–10 carbon atoms
(2) an epihalohydrin, and (3) a tertiary amine of the formula $R'_2NR$ where $R'$ is a radical selected from the group consisting of methyl and ethyl and R is a hydrocarbon group having at least about 6 carbon atoms, formed by mixing and heating (1) and (2) in water at approximately 50–80° C. for approximately ½ to 1 hour, then adding (3) to said aqueous solution and then heating and stirring at about 80–90° C. for about ½ to 1 hour.

2. The quaternary reaction product of claim 1 where A is selected from the group consisting of ethylene and propylene and (2) is epichlorohydrin.

3. The quaternary reaction product of claim 1 wherein (1) is diethylenetriamine pentacetic acid, (2) is epichlorohydrin, and (3) is a tertiary amine of the formula $(CH_3)_2NR$ where R is a hydrocarbon group having at least 8 carbon atoms.

4. The quaternary reaction product of diethylenetriamine pentacetic acid, epichlorohydrin and dimethyl cocoamine, formed by mixing and heating diethylenetriamine and epichlorohydrin in water at about 60° C. for about ½ hour, then adding dimethyl cocoamine to said aqueous solution and then heating and stirring at about 90° C. for about forty minutes.

References Cited

UNITED STATES PATENTS 3,304,349   2/1967   Shen _____ 260—482 XR

LORRAINE A. WEINBERGER, Primary Examiner

ALBERT P. HALLUIN, Assistant Examiner

U.S. Cl. X.R.

252—8.55, 82, 152, 357, 358, 389, 390; 260—468, 471, 999